F. JASZKOWIAK.
CLUTCH.
APPLICATION FILED OCT. 23, 1915.

1,322,793. Patented Nov. 25, 1919.

Inventor
F. JASZKOWIAK
By Watson E. Coleman
Attorney

UNITED STATES PATENT OFFICE.

FRANCIS JASZKOWIAK, OF BISMARCK, NORTH DAKOTA.

CLUTCH.

1,322,793.  Specification of Letters Patent.  Patented Nov. 25, 1919.

Application filed October 23, 1915. Serial No. 57,554.

*To all whom it may concern:*

Be it known that I, FRANCIS JASZKOWIAK, a citizen of the United States, residing at Bismarck, in the county of Burleigh and State of North Dakota, have invented certain new and useful Improvements in Clutches, of which the following is a specification, reference being had to the accompanying drawings.

This invention relates to certain new and useful improvements in clutches and has for its primary object to provide a clutch which is especially designed for use in connection with an irregularly or eccentrically mounted gear, such as is commonly found in well drilling machines and the like.

The invention has for one of its more important objects to provide a clutch designed for the above purpose, which is simple and durable in its construction and whereby a quick and effective locking connection between the loosely mounted gear and the driving shaft may be effected.

In its more specific aspect, the present invention contemplates the provision of a clutch arm keyed or otherwise rigidly fixed upon the operating shaft, the gear loosely mounted upon said shaft being formed upon one face with spaced, outwardly converging ribs between which the clutch arm is adapted to be received when the gear is shifted in one direction or the other.

With the above and other objects in view, my invention consists in the novel features of construction, combination and arrangement of parts to be hereinafter more fully described, claimed and illustrated in the accompanying drawing, in which, Figure 1 is a perspective view illustrating the preferred embodiment of my improved gear clutch;

Figure 1:
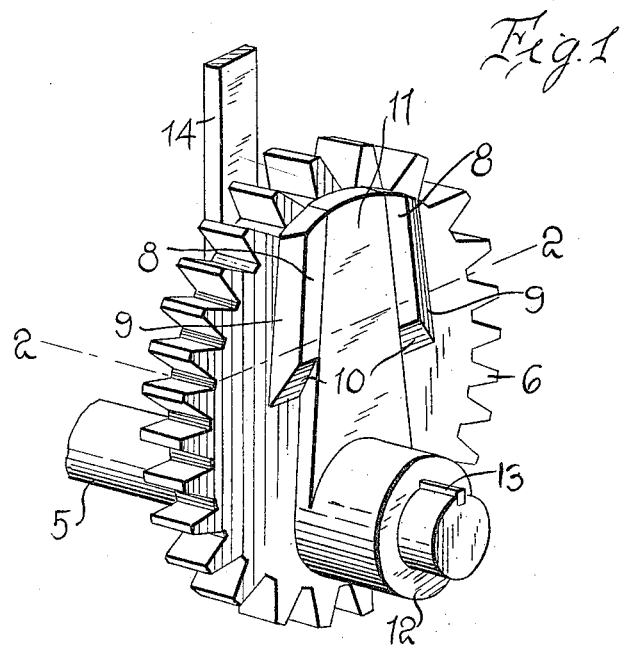
Figure 2:
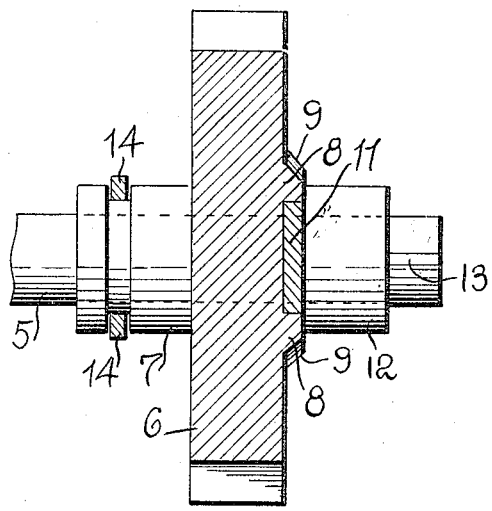
Fig. 2 is an enlarged section taken on the line 2—2 of Fig. 1.
Figure 3:
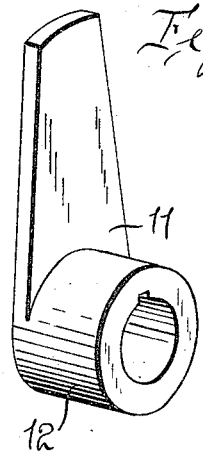
Fig. 3 is a detail perspective view of the clutch arm removed from the shaft.

Referring in detail to the drawing, 5 designates the operating shaft upon which the irregular shaped gear 6 is loosely mounted. This gear is provided upon one face with a peripherally grooved collar 7 which is eccentrically disposed with relation to the gear. Upon the opposite face of the gear 6, spaced cleats or ribs 8 are formed, said ribs converging toward the teeth of the gear. The outer longitudinal edges of these ribs are beveled or inclined, as indicated at 9, and the inner ends thereof are also beveled or inclined, as at 10.

Upon the shaft 5, the clutch arm 11 is mounted, said arm being longitudinally tapered and provided upon its wider end with a hub extension 12 projecting from one side thereof. This hub extension, as well as the shaft 5, are provided with keyways to receive a locking key 13, although it will be understood that any other suitable means may be employed for rigidly securing the clutch arm upon the shaft.

A suitable lever operated yoke member, indicated at 14, is connected to the grooved collar 7 on the gear 6, whereby said gear may be readily shifted axially upon the shaft 5.

In the operation of the invention, it will be readily understood that when it is desired to lock the irregular gear upon the shaft 5 to be rotated thereby, the operator shifts said gear axially upon the shaft toward the relatively fixed clutch arm 11. As this clutch arm rotates with the shaft, it rides over the beveled edges of one of the cleats 8 and into the space between said cleats, it being understood that the gear is forced with considerable pressure against the arm. The gear shifting lever is then locked against movement in the usual manner so that the gear 6 will remain locked upon the shaft 5 and will rotate therewith. In this manner, it will be understood that, by means of a very simple construction and arrangement of the several parts, the eccentric or irregular shaped gears of well drilling machines and other mechanisms may be very easily and quickly locked upon their shafts or released from rotative connection therewith. In all other types of such clutches with which I am familiar, a quite complicated and expensive clutch construction is necessary in order to effect a quick and positive clutching action. This is primarily due to the irregular shape or eccentric mounting of the gear upon the shaft. The present invention, however, may be obviously produced at very small manufacturing cost and is also exceedingly durable as well as reliable and positive in actual operation.

While I have above described the preferred construction and arrangement of the several elements, it is to be understood that, in the practical development of the invention, the same are susceptible of considerable modification in their form, proportion and arrangement and I, therefore, reserve the privilege of adopting all such legitimate changes as may be fairly embodied within the spirit and scope of the invention as claimed.

Having thus fully described my invention, what I desire to claim and secure by Letters Patent is:—

The combination with an operating shaft having a gear wheel eccentrically mounted thereon for free rotation around the shaft, and longitudinal movement thereon, of a clutch arm fixed upon the shaft and having a length approximately equal to the longest radius of the gear wheel, said wheel having upon one face thereof spaced cleats extending approximately parallel to the longest radius of the gear wheel and having their outer ends disposed adjacent the periphery of the gear wheel and their inner ends terminating in spaced relation to the shaft upon which the gear wheel is mounted, said cleats being adapted to receive the clutch arm between them when the gear wheel is shifted axially upon the shaft toward said arm, the lateral edges of the cleats being beveled outward and toward the gear wheel and the inner ends of the cleats being beveled outward and toward the gear wheel.

In testimony whereof I hereunto affix my signature in the presence of two witnesses.

FRANCIS JASZKOWIAK.

Witnesses:
F. B. McCurdy,
D. E. Pilmod.